June 24, 1924.

E. G. K. ANDERSON ET AL 1,498,534

MOUNTING FOR UNIVERSAL SPOTLAMPS

Filed Aug. 13, 1921    4 Sheets-Sheet 1

Inventors
ERNST S. K. ANDERSON
PAUL W. SWANSON

June 24, 1924.

E. G. K. ANDERSON ET AL

1,498,534

MOUNTING FOR UNIVERSAL SPOTLAMPS

Filed Aug. 13, 1921

Inventors
ERNST G.K. ANDERSON
PAUL W. SWANSON

June 24, 1924.

E. G. K. ANDERSON ET AL 1,498,534

MOUNTING FOR UNIVERSAL SPOTLAMPS

Filed Aug. 13, 1921    4 Sheets-Sheet 3

Inventors
ERNST G. K. ANDERSON
PAUL W. SWANSON

June 24, 1924.

E. G. K. ANDERSON ET AL 1,498,534

MOUNTING FOR UNIVERSAL SPOTLAMPS

Filed Aug. 13, 1921 4 Sheets-Sheet 4

Inventors
ERNST G. K. ANDERSON
PAUL W. SWANSON
by William L. Hall Atty

Patented June 24, 1924.

1,498,534

UNITED STATES PATENT OFFICE.

ERNST G. K. ANDERSON, OF EVANSTON, AND PAUL W. SWANSON, OF CHICAGO, ILLINOIS, ASSIGNORS, BY MESNE ASSIGNMENTS, TO APPLETON ELECTRIC CO., OF CHICAGO, ILLINOIS, A CORPORATION OF ILLINOIS.

MOUNTING FOR UNIVERSAL SPOTLAMPS.

Application filed August 13, 1921. Serial No. 492,036.

*To all whom it may concern:*

Be it known that we, ERNST G. K. ANDERSON and PAUL W. SWANSON, citizens of the United States, and residents of Evanston, in the county of Cook and State of Illinois, and Chicago, in said county and State, respectively, have invented certain new and useful Improvements in Mountings for Universal Spotlamps; and we do hereby declare that the following is a full, clear, and exact description thereof, reference being had to the accompanying drawings and to the characters of reference marked thereon, which form a part of this specification.

This invention relates to improvements in universally operable spot or signal lamps for vehicles or the like, and refers more especially to that type of such lamps which is adapted to be mounted on a vehicle in position to be operated by the driver within the body of the vehicle body, or at a point distant from the lamp to enable the lamp to be adjusted to throw its rays in substantially universal directions from the point of suspension of the lamp on the vehicle body.

The present invention relates more particularly to a novel mounting and operating mechanism for such lamp structures, so constructed as to enable a lamp supported outside the vehicle body to be adjusted from a point within said body, whether the body be a so-called closed body or one having a foldable top, the construction being such that the driver, in manipulating the lamp, is not required to extend his hand outside the body of the vehicle. The structure is also so arranged that the lamp can be universally adjustable outside the body independently of its operating mechanism for adjusting the lamp at a point distant therefrom.

Among the objects of the invention is to simplify and reduce the cost and dimensions of a lamp mounting operating structure of this general type whereby the movements of the lamp may be accomplished by a minimum number of simply made parts that can be compactly and neatly arranged in the structure.

Another object of the invention is to provide an improved mounting for the parts of the structure which permit universal movement of the mounting members, and, incidentally, this phase of the construction is associated with novel means for attaching the mounting to a vehicle structure and for frictionally locking it in different positions of adjustment by means which permit adjustment of the lamp throughout its range by the application of a moderate force.

Another object of the invention is to simplify the connection of the circuit wiring, its means for including the lamp bulb therein, and to improve and simplify the switch mechanism for controlling said circuit.

Other objects of the invention are to further improve spot lamp mountings and actuating means therefor, and the invention consists in the combination and arrangement of the parts shown in the drawings and described in the specification, and is pointed out in the appended claims.

The present invention, as herein shown, is more especially adaptable for use in connection with a demountable lamp of that type in which the lamp is connected to a source of current supply through a long lamp cord which, when the lamp occupies its normal position, is wound on a reel, and wherein the lamp is capable of being demounted from its structure for use as a trouble lamp, the cord being at such time adapted to be unwound from, and rewound on the reel, located in any suitable position relatively to the lamp so that the conductors of the cord will be in condition to maintain circuit to the lamp both when operating as a spot or trouble lamp. In such construction one of the rotative joint elements of the lamp mounting for permitting proper movability to the lamp can be formed in part in connection with the casing for containing and supporting the reel for the lamp. The invention is, however, capable of adaptation to other types of lamps.

In the drawings;

Figure 11 illustrates the manner of mounting the improved structure on a closed car body.

Figure 9:
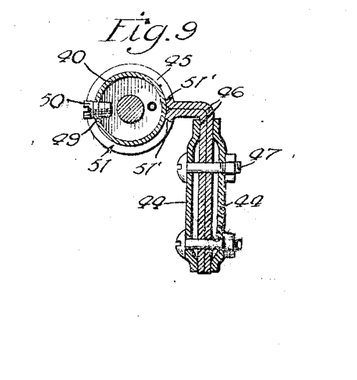
Figure 9 is a section on the line 9—9 of Figure 2.
Figure 10:
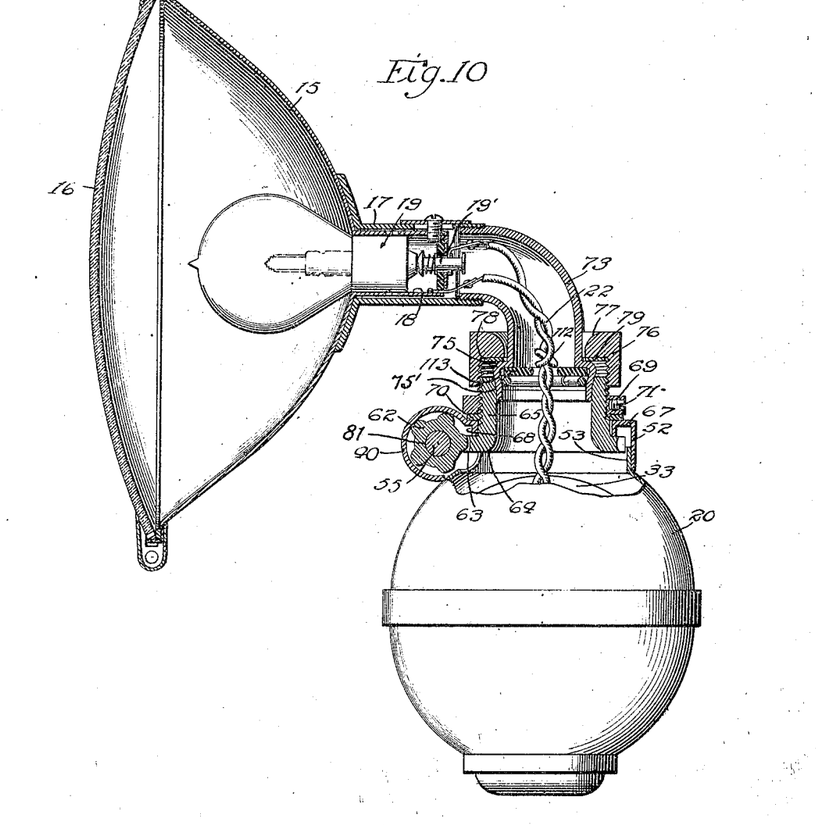
Figure 10 is a partial side elevation and partial section of the lamp casing and rewinding reel casing.

First referring to the construction shown in Figures 1 to 10, inclusive, 15 designates a lamp casing shown as of single shell type. It is closed at its front by the usual lens 16. It may have a nipple 17 fixed to its rear side to receive the socket 18 of a lamp bulb base 19. These latter details are shown in Figure 10.

20 designates a casing to receive and support a reel which embraces a central spool 21 on which the lamp cord 22 is wound and from which it is unwound, through which cord current is delivered to the lamp from any suitable external circuit to be hereinafter described. The reel is normally under the influence of involute, reversely coiled, rewinding springs 23, 24, that are mounted in barrels 25, 26 at the ends of the reel spool. The spring 24 is attached at its outer end, as by a rivet, to the annular flange 27 of a retaining cup 28 within the barrel 26, and is attached at its other or inner end to a fixed shaft 29 which extends across and is supported at its ends in the casing 20. The spring 23 is in a similar way attached at its inner end to a tubular shaft 30 which is mounted to rotate on the fixed shaft 29, said tubular shaft 30 extending freely at one end into the barrel 25 through its spring retaining plate 31; and the other or outer end of said spring 23 is fixed to the cylindrical wall of the barrel 25. The end of the tubular shaft 30 remote from the barrel 25 is fixed in any suitable manner at 32 to the end wall of the retaining cup 28, centrally thereof. The said reel is generally like the reel shown in my pending application for United States Letters Patent, Number 317,398, filed August 14, 1919, and the cord retaining flange 33 at the ends of the spool are formed as integral parts of the barrels, the spool being interlocked to said barrels.

One conductor 34 of the lamp cord is grounded on a metallic part of the reel, as the flange of the barrel 25, which ground connection may be completed in any suitable way to one pole of a battery, or like source of current. The other conductor 35 of the lamp cord is connected in the manner shown in Figures 7 and 8 to a commutator plate 36 which rotates with and is insulated by the insulator 36′ from the reel structure, and is concentric to the shaft 29. The connections between the conductor 35 and plate 36 embrace a conducting arm $36^2$ which is electrically connected to the conductor 35 through an eyelet 35′ that extends through and is insulated from the flange 33 of the barrel 26. Said plate 36 is adapted for wiping engagement with a fork shaped brush 37, insulated from the casing and whose shank 38, insulated from the casing 20, is electrically connected to an eyelet 38′ also insulated from the casing, and to which is connected a conductor 39 that constitutes the other side of the external circuit. Thus the conductor 34 is grounded on the lamp and machine frame to one pole of the battery, while the other side of the external circuit is connected directly to the other pole of the battery in a manner which will be hereinafter described. The other ends of the conductors of the lamp cord 22 are respectively connected to the shell 18 and central terminal 19′ of the socket 19, as best shown in Figure 10.

Referring now more particularly to the construction of the universal mounting elements of the lamp structure and to the means for actuating said mounting members to impart universal adjustment and direction to the lamp, and thereby substantially universally project the lamp rays, said parts are made as follows:

40 designates a tubular bracket arm which constitutes the principal supporting element of the mounting in that it is directly supported by attachment to the vehicles and carries at its outer end the lamp and the reel structure. As shown in Figures 1 to 10 inclusive, said bracket arm 40 is indirectly supported at its inner end on a windshield post 41 of the vehicle by means of a suitable form of clamp which holds the bracket arm 40 reliably in adjusted position with respect to its support on said windshield frame post or other support, but permits said bracket arm to turn on its axis.

Figure 1:
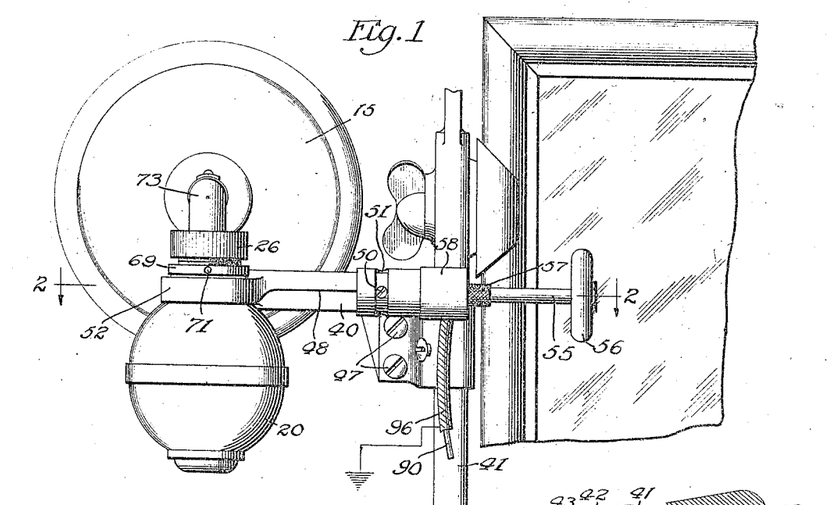
Figure 1 is a fragmentary view of a portion of a vehicle showing the manner of applying our improved spot lamp mounting and actuating mechanism thereto.
Figures 2, 3, 4, 5, 6:
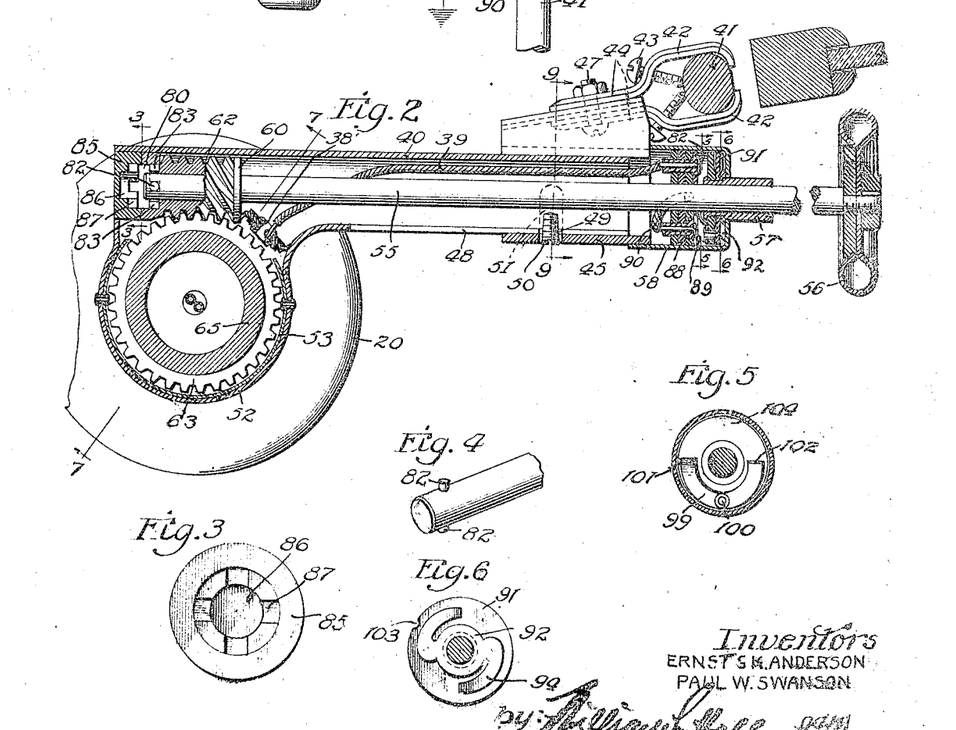
Figure 2 is a horizontal section on the general line 2—2 of Figure 1.
Figure 3 is an enlarged detail section on the line 3—3 of Figure 2.
Figure 4 is a detail of a clutch element hereinafter to be described.
Figure 5 is a cross section on the line 5—5 of Figure 2.
Figure 6 is a cross section on the line 6—6 of Figure 2.
Figure 2:
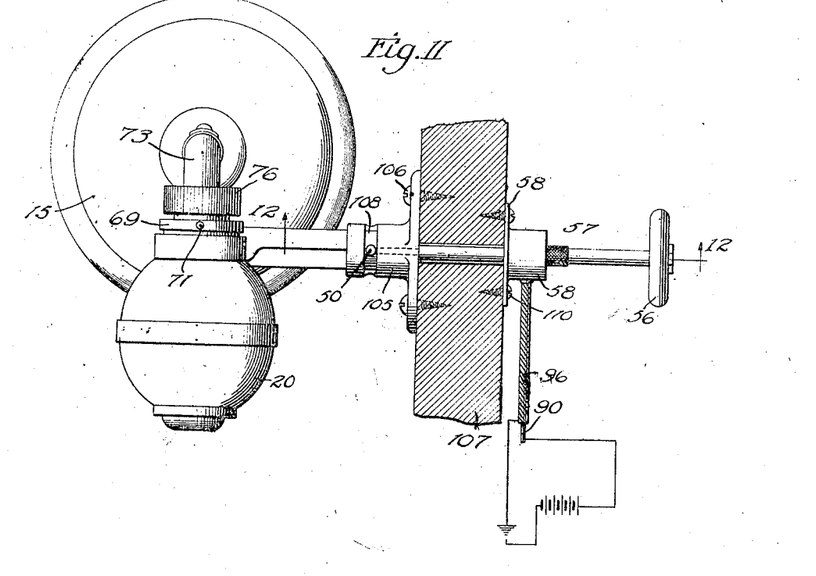

A convenient form of supporting bracket for open car bodies is best shown in Figures 2 and 9. It comprises a pair of jaws 42 which embrace said post, and are fixed thereto by clamping screws 43. Said jaws are formed with parallel shanks 44. 45 designates a collar which surrounds and is adapted to grip the bracket arm. It is formed with two offset arms 46, 46 which extend forwardly from the collar and thence downwardly between the shanks 44 of the bracket, and the parts are adapted to be clamped together by clamp bolts 47, as best shown in Figures 1, 2, and 9.

For the purpose of locking said bracket arm 40 in said supporting collar 45 to prevent accidental turning of the bracket arm and the lamp mounting supported thereon, the said bracket arm is longitudinally split at 48 throughout the greater portion of its length and is provided at the sides of its split portion with opposing semi-circular recesses 49 to form an opening that is threaded to receive a tapered, headless screw 50. Said tapered screw extends at its outer end through a curved slot 51 that is formed throughout the principal circumference of the collar 45, there being limiting stops 51' (Figure 9) in said groove to limit the turning of the bracket arm to less than full rotation. The function of the tapered screw 50, engaging in the threaded openings at the split portion 48 of the bracket arm 40 is to expand the inner split end of the bracket arm into close internal frictional engagement with the inner surface of said collar and thereby constitute a means for rigidly holding the bracket arm in the collar which, in turn, is fixed to the support 41 by the bracket described, while at the same time permitting said frictional contact to be such as to allow the bracket arm 40 to turn therein. The curved extension of the slot 51 permits the screw 50 to shift angularly with the bracket arm when the latter is turned until said turning movement is limited by the shoulders 51 before described, while at the same time holding the parts locked in place.

Figure 7:
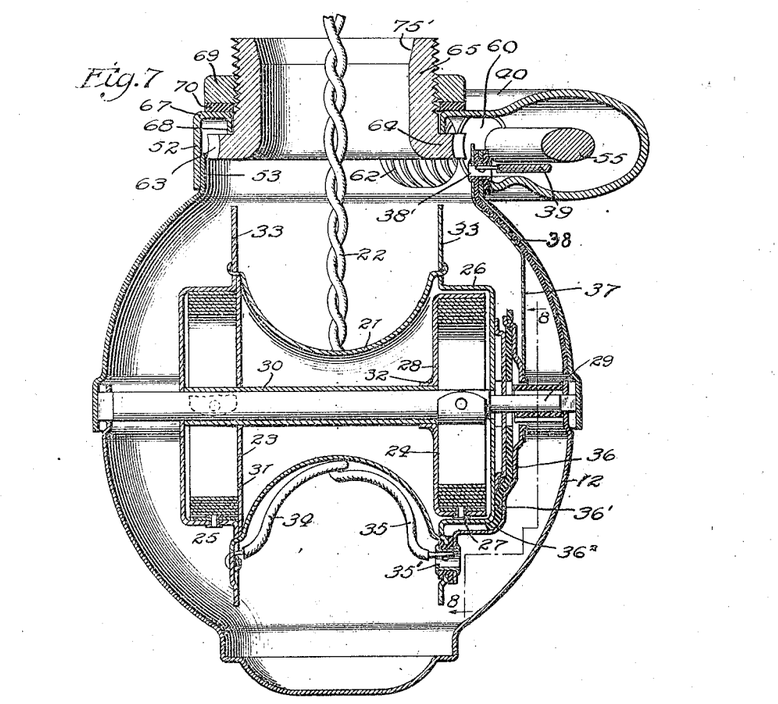
Figure 7 is an enlarged oblique section on the line 7—7 of Figure 2.
Figure 8:
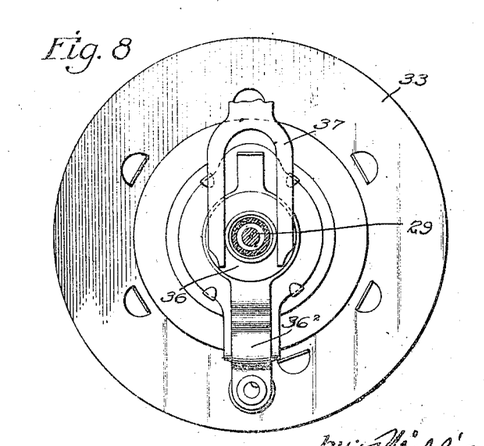
Figure 8 is a section on the line 8—8 of Figure 7.

The said split bracket arm 40 described is fashioned out of a piece of sheet metal by suitable die operations to produce the slotted bracket arm, and at one side thereof an integral, laterally disposed ring member or mounting element 52 to embrace and to be rigidly attached to a tubular upstanding flange 53 surrounding the upper, open end of the reel casing or shell, as best shown in Figures 2, 7, and 10. The construction described constitutes a simple and effective way of fixing the reel casing and a lamp mounting to the outer end of the bracket arm 40, but, so far as the broader phase of the invention is concerned, may be otherwise fabricated.

55 designates a shaft, centrally within and axially displaceable along the axis of the tubular bracket arm 40. It may be a solid or hollow shaft. Said shaft terminates normally slightly short of the outer end of the bracket arm and extends at its inner end inwardly beyond the inner end of said arm. It is there provided with a hand wheel 56, located convenient to the driver of a motor vehicle, and by which said shaft 55 may be rotated. Said shaft 55 is rotative relative to the bracket arm 40 and is rotatively mounted near its inner end in a bearing nipple 57 that is fitted axially in any suitable manner in the end wall of a metal cap 58 that overlaps and is fixed rigidly to the inner end of the collar 45. The nipple 57 is rotative on the shaft 55, and may constitute the actuating element of a switch, as will hereinafter more fully appear. The shaft 55 has a rotative bearing near its outer end in a centrally apertured disc 60 within and is fixed rigidly in any suitable manner near the outer end of the tubular bracket arm 40.

Mounted on said shaft 55, beyond the bearing 60, to turn therewith at times and at other times to be free thereon, is a worm 62 that meshes with a worm gear 63 which is cut on the periphery of a flange 64 on the lower end of an upstanding tubular neck 65 that is fixed in any suitable manner to the reel carrying shell or case 20. As herein shown, said neck is fixed to the shell by means made as follows:

The clasp or ring member 52 of the bracket arm 40 is formed with an inturned radial flange 67 and with a downturned cylindric lip 68, which latter rests on the upper face of the outstanding flange 64 of the neck 65 on which is formed the worm gear 63. The neck is exteriorly threaded to receive a nut 69, between which and the horizontal or flanged portion 67 of the ring or clasp 52 is interposed a compression ring 70. Said nut 69 is locked on the threaded portion of the neck by means of a flush end set screw 71 (Figure 10) threaded through an opening in the ring and bearing against the threads of the neck.

The lamp casing 15 is supported on the neck 65 by means of an elbow fitting 73, the horizontal arm of which is threaded within the rear open end of the casing nipple 17. The vertical arm of the elbow fitting is rotatively mounted in the neck by means to lock it from accidental angular displacement, while permitting it to be rotated about the vertical axis of the arm in a manner to swing the lamp casing horizontally. The connection herein shown comprises a downwardly tapered head 75 formed on the vertical arm member of the elbow fitting which engages a corresponding taper 75' (Figure 7) in the upper open end of the neck 65; and said tapered portions are pressed together through the medium of a locking nut 76 that is threaded to the neck and has an overhanging apertured portion 77 to form a downwardly facing shoulder 78 to bear, through the intermediary of a compressible packing washer 79, on an upwardly facing shoulder at the tapered portion of the elbow fitting. The overhanging or flanged portion of the nut has a central opening upwardly through which extends the vertical arm of the elbow fitting.

Rotation of the central shaft 55 acts, through the worm 62 (when the latter is locked on said shaft) and worm gear 63, to turn the neck 65 within the clasp 52 and to thereby swing the lamp casing through its horizontal sweep. Also, by reason of the friction connection of the elbow member with the neck 65, the said lamp casing can be manually swung horizontally about the axis of the neck independently of the mechanical adjustment when the shaft 55 is released from the worm gear 62. As herein shown, the worm can be locked to said shaft 55 by elongating the outer end of the worm, to form a recessed portion 80 which surrounds the axial bore of the worm through which the shaft 55 extends, and the shaft can be provided with clutch projections 82, preferably formed by the ends of a pin that extends transversely through the said shaft, and the bottom of said recessed portion may be provided with radial slots 83, adapted to receive the said clutch pin ends when the shaft 55 is pulled inwardly. The worm is thus locked or clutched to the shaft to rotate with it. During this time there is no connection of rotation between the shaft 55 and the bracket arm 40 and the said arm does not turn. The said bracket arm is turned in its bearing through said shaft by the following construction. 85 designates a plug that fits closely within the outer end of the tubular bracket arm 40, and may be fastened thereto in any suitable manner, as by means of one or more screws. Said plug is formed on its inner face with a central recess 86 to receive the end of the shaft 55 beyond said clutch pin, and is provided laterally exterior to said recess with a series of shallower radial slots 87 (Figures 2 and 3), into which the extended ends of the clutch pin are adapted to enter when the shaft 55 is turned in proper direction for registry of the ends of said pin with said slots and the shaft then pushed outwardly axially through the tubular bracket arm 40. The inner end of said plug 85 is, therefore, similar to the outer end of the worm 62, and Figure 3 illustrates essentially both said parts.

The said radial slots of said elements act with the ends of said cross pin to constitute elements of clutches, with the pin a part common to both said clutches, and adapted to selectively and alternately connect said shaft 55 to said worm gear and to said tubular bracket arm. When the clutch pin is in neutral position, or between the slots 83, 87, rotation of the shaft 55 imparts no movement to either the bracket arm or the worm gear.

With this construction it will be observed that when the clutch pin engages the clutch recesses of the worm and the central shaft 55 is rotated, said shaft acts through the worm 62 and the worm gear 63 to turn the reel casing and the lamp casing about the axis of the vertical arm of the elbow fitting 73, and thereby serves to swing the lamp casing from side to side and project the light rays in horizontal directions. When the central shaft 55 is pushed outwardly to engage the clutch pin with the slots or recesses 87, such movement effects a solid connection between the central shaft and the tubular bracket arm, so that rotation of the central shaft operates to rotate said bracket arm 40. By reason of the connection of the lamp structure with the outer end of said tubular bracket arm, as described, said lamp casing will be swung vertically about the axis of the inner shaft 55. Through the construction described it will be noted that both vertical and horizontal swinging movements can be imparted to the lamp casing to direct the light rays in substantially universal direction through power applied to the handpiece 56 of the single shaft 55, the shaft acting through the worm and gear mechanism to turn the lamp casing in a horizontal plane, and acting through the solid connection afforded by the clutch described with the outer or tubular bracket arm 40 to swing the lamp in a vertical plane. The worm 62 is held axially fixed by being confined between said mounting disc 60 and the plug 85.

The organization and cooperation of the parts described is such that axial movement of the shaft 55 is not a lamp actuating movement but is merely a movement to set the clutch selectively engaged with the worm 62 or plug 85, or to set the clutch pin in neutral position relatively to both the worm and plug. It will also be observed that all movements of shaft 55 to actuate the lamp are movements of rotation, and also that when the clutch pin is engaged with the clutch slots of the worm gear, the shaft 55 can have rotational movement relatively to and independent of rotational movement of the tubular bracket arms or the lamp support carried thereby.

It will also be observed that the lamp, having the distant control through the hand piece 56, may be swung by hand power directly applied to the lamp or reel casing, independently of the said distant control mechanism, so that it is unnecessary for a person standing on the ground at the side of the vehicle to reach his hand into the vehicle body to adjust the angular movements of the lamp. When thus adjusting the lamp by directly applied hand power, the lamp will swing for horizontal adjustment on the tapered joint constituted by the head 75 of the elbow fitting and the neck 65, about the axis of said neck, and will be adjusted to swing vertically by turning the bracket arm within the frictional supporting collar 45 and about the axis of said collar. It will be also observed that in the construction shown the controlling shaft 55 is eccentric with respect to both the lamp and the reel casing and that the latter, therefore, in a manner balance themselves about the axis of the operating shaft 55, so as to thereby, to a substantial extent, decrease the power necessary to swing the lamp through its vertical sweep and also minimizes tendency of turning movement of the bracket arm 40 to cause accidental angular displacement of said arm relatively to its supporting sleeve 45. The construction described is, therefore, well adapted to the form of lamp and reel structure shown and produces an efficient, compact, and attractive job.

As shown in Figures 1 to 10, inclusive, one side of the circuit, including the lamp circuit and the external circuit to the battery, is grounded to the lamp structure and therethrough to the vehicle and to one pole of the battery. As shown in Figure 7, the conductor 34 is the grounded conductor of the lamp cord and the conductor 35 is connected through the contact plate 36, a wiper member 37, and the eyelet 38' to the live conductor 39 of the external or energizing circuit. The said conductor 39 is insulated in its part which extends through the tubular bracket arm 40 and terminates in a switch contact 82 mounted in a non-rotative laminated insulating disc 88 within the shell 58 before referred to. 89 designates a second contact that is also mounted in said laminated disc 88 and is connected to a conductor 90 which constitutes part of the live side of the external or energizing circuit. The face of the contact 82 is substantially flush with the outer side of the outer lamina of the disc 88, while the like face of the contact 89 is somewhat embedded below said face, as best shown in Figure 2. 91 designates a built up laminated disc, spaced inwardly from the disc 88, and the members of which are fixed to the outer end of the nipple 57, before referred to, which is rotative on the central control shaft 55. Said nipple extends loosely through a central opening in the end wall of the cap 58 and is reduced at its outer end within the said cap, and the insulating disc 91 is confined between a shoulder thereon and the outer upset end of the nipple, as shown in Figure 2. A spring conducting washer 92 is confined between said disc 91 and the shoulder on the shaft and is formed with outwardly curved spiral arms 94 that bear against the end wall of the cap 58 to constitute part of the grounded side of the circuit, said grounded circuit continuing from the cap through a tubular conductor 96 having the form of an armored conductor that encloses the conductor 90 of the live side of the circuit. Said armored conductor may be connected through a ground on the vehicle frame to the battery, when the switch now to be described is closed.

The said switch embraces the contacts 82 and 89 and also a semi-circular closing bridge 99 that is centrally fastened by an eyelet 100 to the disc 91 which is rotated by the nipple 57. It will be noted that the switch contacts 82 and 89 are located about 180° apart and that the ends of the closing bridge 99 are spaced substantially the same angular distance. Therefore, when one of the ends 101 of said closing bridge, which is bent sharply outwardly, engages the depressed contact 89, the other or flatter end 102 is engaged with the flush contact 82. In this position the live side of the external circuit is closed and thereby closes the circuit to the lamp through the commutator member at the reel and to the ground. The movable part of said switch is opened and closed by a short angular turn thereof through the member 57 and movement of the said part is limited by engagement of a depression 103 in the disc adapted to engage a suitable stop 104 in the cap 58, as shown in Figure 5. The resiliency of the arms 94 of the member 93 serves to press the ends of the closing member yieldingly toward their contacts 82 and 89 and thereby maintain good electrical contact at the switch terminals.

The switch construction shown well adapts itself to the general construction of the lamp control mechanism, inasmuch as the nipple 57, which constitutes the switch actuator, also serves as a bearing for the rotative control shaft 55 and also serves, in connection with the armed conducting washer to close the grounded circuit from the ground on the lamp structure to the armored conductor 96.

Figure 12:
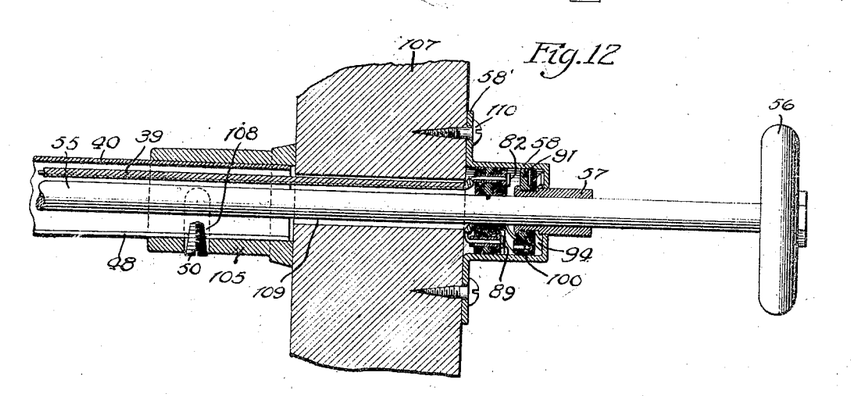
Figure 12 is an enlarged section on the line 12—12 of Figure 11.

The construction shown in Figures 11 and 12 is designed for use in connection with a closed car body having an entrance doorway closed by a door. As shown in said figures, the tubular bracket arm 40 extends at its inner end and is fixed in a metal bracket 105 that is attached in any suitable manner, as by means of the screws 106 to the outer side of the body wall 107. The said bracket 105 takes the place of the sleeve 45 shown in the figures previously described, and the expanding screw 50 extends through a curved groove 108 in the mounting bracket or sleeve 105 for a threaded expansive engagement with a threaded opening at the slit of the split tubular bracket arm 40, as described in connection with the aforementioned figures.

The central shaft 55 extends through the bracket arm 40 and through an opening 109 in the support 107, said opening being somewhat larger than the shaft to permit passage of the conductor 37 therethrough to the terminals 87 and 89 of the insulated disc 88. The construction of the switch to close one side of the circuit is the same as that shown in the previously described figures and like parts bear the same reference characters. In Figures 11 and 12, however, the cap 58 is formed with a flange 58' that fits flat against the inner side of the support 107 and may be attached thereto, as by means of the screws 110. In other respects the construction and operation shown in said Figures 11 and 12 is like that illustrated in connection with the previously described figures.

In order to avoid the tension of the conductors of the lamp cord from being separated from the lamp base terminals, the said cord 22 is provided with a knot 112 or other enlargement arranged above an apertured disc 113 in the cord conduit of the elbow fitting 73, as shown in Figure 10. Said disc is fixed in any suitable manner in said conduit, as by being confined between a downwardly facing inturned shoulder of the head 75 and a split ring interlocked to said head below said disc. Said knot or enlargement 112 is larger than the aperture of the disc and receives the full tension of the cord as it is unwound from the reel.

We claim as our invention:

1. In combination, an elongated, tubular bracket having means to rotatively mount it on a support, a lamp rotatively mounted on said bracket, and a single shaft extending axially through said bracket and having means at its outer end to alternately and selectively connect it to said bracket and to said lamp to separately rotate the bracket and lamp and to impart universal movement to the lamp.

2. In combination, a tubular bracket having means to rotatively mount it on a support, a lamp rotatively mounted on said bracket, a single shaft, combined gear and clutch means at the outer end of and controlled by said shaft to alternately connect said shaft to said bracket and to said lamp to separately rotate them and to impart universal movement to the lamp, and means whereby the clutch means can be positioned to neutral, whereby said lamp can be manually and universally adjustable independently of operative movement of said shaft.

3. A spot lamp and mounting comprising an elongated, rotative bracket, means to support a lamp structure thereon to partake of the rotational movement of said bracket, and to itself rotate on an axis at an angle to that of said bracket, and provided with a gear, a second gear supported by the other end of said bracket and meshing with said first gear, a single, axially movable operating shaft extending loosely through said second gear, and selective clutch means, embracing parts on the outer end of said shaft and cooperative parts on said bracket and said second gear, so combined that axial movement of said shaft alternately engages the clutch means, and rotative movement thereof operates to impart universal movement to the lamp structure.

4. A spot lamp and mounting comprising a tubular bracket having means of rotational connection to a support, a lamp supported thereby to partake of the movement of the bracket, and to be independently rotatable on an axis at an angle to the axis of said tubular bracket, a shaft disposed axially in and movable axially along said tubular bracket and adapted for rotational movement relative to said bracket, and cooperating at its outer end with selective clutch and gear means operated by said shaft for operatively connecting said shaft to the bracket and to said lamp.

5. A spot lamp and mounting comprising a tubular bracket having means of rotational connection to a support, a lamp rotatively supported on the outer end of said bracket to rotate on an axis at an angle to the rotational axis of said bracket and provided with a gear, an operating shaft axially within and endwise movable along said tubular bracket and provided with a gear for constant mesh with the gear of the lamp structure, said shaft being provided at its inner end with a fixed knob and at its outer end with means to selectively and operatively engage it with said bracket and gear.

6. A spot lamp and mounting comprising a tubular bracket having means of rotational connection to a support, a lamp rotatively supported on said tubular bracket and provided with a gear, an axially movable operating shaft extending through said tubular bracket and provided at its inner end with a fixed hand piece, a gear to mesh with the gear of the lamp structure and having a bore through which the outer end of said shaft extends, and means whereby said shaft can be selectively locked to said gear and to said bracket to alternately rotate them, said bracket being adapted to be manually rotated about its axis independently of said shaft.

7. A spot lamp and mounting comprising a tubular bracket having means of rotational connection to a support, two independent rotative joints to support the lamp from said bracket, said joints being in a plane at an angle to the plane of the axis of rotation of the bracket, and about one of which the lamp is adapted to be manually rotated, and a rotative actuating shaft extending through and axially movable in said tubular bracket and having at its outer end means to selectively and alternately connect it to the other rotative joint and to said bracket.

8. A spot lamp and mounting comprising a tubular bracket having means for rotational connection to a support, a lamp rotatively mounted thereon and provided with a gear, an operating shaft within said tubular bracket provided with a gear in constant mesh with the gear of the lamp, said shaft having limited axial movement to release it from and lock it to said gear, and means cooperating through axial movement of the shaft to separately lock it to said bracket.

9. A spot lamp and mounting comprising a tubular bracket having means of rotational connection to a support, a lamp structure rotatably supported thereon at an angle to the rotational axis of the bracket, an operating shaft within said tubular bracket, a worm gear on the lamp structure, a worm meshing said gear through which said shaft is axially movable, and opposing clutch elements on the bracket and worm to which the shaft is separately engageable by endwise movement of the shaft.

10. A spot lamp and mounting comprising a tubular bracket having means of rotational connection to a support, a lamp structure rotatably supported thereon on an axis at a right angle to the rotational axis of the bracket and provided with a gear, a rotative operating stem within said tubular bracket, a pinion meshing with said gear and through which the shaft is axially movable, clutch elements on said bracket and gear, embracing opposed radial clutch slots, and radial projections on the shaft adapted by endwise movement of the shaft to separately enter the slots of said clutch elements.

11. A spot lamp and mounting comprising a tubular bracket having means of rotational connection to a support, a lamp structure rotatably supported thereon on an axis at a right angle to the rotational axis of the bracket and provided with a gear, a rotative operating shaft within said tubular bracket, a pinion meshing with said gear and through which the shaft is axially movable, clutch elements on said bracket and gear, embracing opposed radial clutch slots, and radial projections on the shaft adapted by endwise movement of the shaft to enter the slots of either of said clutch elements, said clutch elements being spaced to permit said projections to occupy a neutral position between them.

12. A spot lamp and mounting comprising an elongated tubular bracket having means of rotational connection at one end to a support, a lamp structure supported at the other end of the bracket to rotate in a plane at an angle to the rotational axis of said bracket, and an axially shiftable operating shaft within and rotatably mounted at both ends of said bracket, and provided at its inner end beyond the bracket with an operating wheel and at its outer end with selective means operable through alternate axial shifting of the shaft to selectively set the shaft in position to impart universal movement to said lamp structure upon rotation of said shaft.

13. A spot lamp and mounting comprising an elongated tubular bracket having means of rotational connection at one end to a support, a lamp structure supported at the other end of the bracket to rotate on an axis at an angle to the rotational axis of said bracket, and a lamp operating shaft within and rotatably mounted at both ends of said bracket, and provided at its inner end beyond the bracket with an operating wheel, the bracket bearing for said shaft adjacent to said operating wheel constituting an actuating mechanism for a lamp circuit switch.

14. A spot lamp mounting comprising a slitted tubular bracket, a solid tubular member having means of attachment to a support and in which one end of the bracket is mounted to rotate, means to expand the slitted bracket in said tubular member to frictionally lock it from rotation, a lamp structure carried by the other end of the bracket to rotate on an axis at an angle to the rotational axis of said bracket, and means to rotate said lamp structure on said bracket.

15. A spot lamp mounting comprising a slitted, tubular bracket, a solid tubular member having means of attachment to a support and in which one end of the bracket is mounted to rotate, means to expand the slitted bracket in said tubular member to frictionally lock it from rotation, a lamp structure carried by the other end of the bracket to rotate on an axis at an angle to the rotational axis of said bracket, an actuating shaft extending through and having rotative bearing in the bracket, and means to alternately connect said shaft to the bracket and to said lamp structure to separately rotate them.

16. A spot lamp mounting comprising a slitted, tubular bracket, a solid tubular member having means of attachment to a support and in which the bracket is rotatively mounted, a tapered stud threaded in an opening in said bracket which is intersected by the slit of the bracket for expanding the bracket outwardly in locking frictional engagement with said tubular member, and means to rotatively support a lamp structure on said bracket.

17. A spot lamp mounting comprising a slitted bracket, a solid tubular member having means of attachment to a support and in which the bracket is rotatively mounted, a tapered stud threaded in an opening in said bracket which is intersected by the slit of the bracket for expanding the bracket outwardly in locking frictional engagement with said tubular member, a lamp structure supported on said bracket, an actuating shaft rotatively mounted in said tubular bracket, with means to rotate it, and means whereby said shaft can be separately connected to said bracket and to said lamp structure to independently rotate them.

18. A spot lamp mounting comprising a slitted bracket, a solid tubular member having means of attachment to a support and in which the bracket is rotatively mounted, and a tapered stud threaded in an opening which is intersected by the slit of the bracket, said tubular member being provided with a curved slot having shoulders at its ends and the expanding screw extending through said slot to engage the shoulders to limit rotational movement of the bracket in said member.

19. A spot lamp and mounting comprising a tubular bracket having means of rotational connection to a support and provided at its outer end with a mounting, a member rotatively supported in said mounting, a lamp structure supported by said member, and an actuating shaft extending through said bracket and provided at one end with a hand piece, and means at the other end of said shaft to selectively and operatively connect said shaft to said member and to the bracket, to thereby impart universal movement to said lamp structure.

20. A spot lamp and mounting comprising a tubular bracket having means of rotational connection to a support and provided at its outer end with a mounting, a member rotatively supported in said mounting, a lamp structure supported by said member, and an actuating shaft extending through said bracket and provided at one end with a hand piece, and means at the other end of said shaft to selectively and operatively connect said shaft to said member and to the bracket, to thereby impart universal movement to said lamp structure, said means of rotational connection for said bracket embracing a frictional joint to normally hold the bracket from rotation, while permitting it to be turned either by hand or by said shaft.

21. A spot lamp and mounting comprising a tubular bracket having means of rotational connection to a support and provided at its outer end with a mounting, a member rotatively supported in said mounting and provided with a gear flange, an annular flange on the mounting adapted to bear against said gear flange, a lamp casing supported on and movable with said member, and a shaft extending through said bracket and having means to selectively gear it to said gear flange and to interlock it to said bracket.

22. A spot lamp and mounting comprising a tubular bracket having means of rotational connection to a support and provided at its outer end with a mounting, a tubular, upstanding member rotatively supported in said mounting and provided with a gear flange, an operating shaft rotatively mounted in said tubular bracket and having selective means to gear it to said rotative member and to lock it to said bracket, a lamp casing, and a fitting, one end of which is connected to said casing and the other end of which is demountably fitted to said tubular member.

23. A spot lamp and mounting comprising a tubular bracket having means of rotational connection to a support and provided at its outer end with a mounting, a tubular, upstanding member rotatively supported in said mounting and provided with a gear flange, an operating shaft rotatively mounted in said tubular bracket and having selective means to gear it to said rotative member and to lock it to said bracket, a lamp casing, and a fitting, one end of which is connected to said casing and the other end of which is demountably fitted to said tubular member, the union between said tubular member and said elbow fitting embracing a frictional joint permitting said fitting and the lamp casing to be angularly turned relatively to said tubular member.

24. A spot lamp and mounting comprising a tubular rotative bracket, means to support a lamp and a cord rewinding reel support thereon to partake of the rotational movement of the bracket and to rotate on an axis at a right angle to that of the bracket, and a single operating shaft extending through said bracket to separately give movements of rotation to said bracket and to said lamp on axes disposed at angles to each other, said bracket and shaft being located in a vertical plane between said lamp and said reel structure.

25. A spot lamp and mounting comprising a tubular rotative bracket provided at one end with a mounting, a lamp casing, a lamp cord reel casing supported in said mounting, a hollow upstanding member rotatively mounted in said mounting, a fitting to connect said upstanding member to said lamp casing, and a rotative shaft within said bracket having separate means to connect it to said upstanding member and bracket to separately rotate them, said bracket and shaft lying between said reel casing and lamp casing.

26. A spot lamp and mounting comprising a tubular rotative bracket provided at one end with a mounting, a lamp casing, a lamp cord reel casing supported in said mounting, a hollow upstanding member rotatively mounted in said mounting, a fitting having a member to which said lamp casing is fixed, and a member connected by a demountable joint to said upstanding member, and a rotating actuating shaft within said bracket to separately rotate said upstanding member and said tubular bracket.

27. A spot lamp and mounting comprising a tubular rotative bracket formed at one end to provide a mounting, a lamp casing, a lamp cord reel casing supported in said mounting, a hollow upstanding member rotatively mounted in said mounting, a fitting having a member to which said lamp casing is fixed, said upstanding member having a tapered seat and said fitting having a tapered terminal to rotatively engage said tapered seat, and means to separately rotate said bracket and said upstanding member.

28. A spot lamp and mounting comprising a tubular rotative bracket formed at one end to provide a mounting, a lamp casing, a lamp cord reel casing supported in said mounting, a hollow upstanding member rotatively mounted in said mounting, a hollow fitting to connect said lamp casing to said upstanding member and to afford a conduit for the lamp cord from the reel casing to the lamp terminals, and an operating shaft within said hollow bracket to separately rotate said upstanding member and said bracket.

29. A spot lamp and mounting comprising an elongated tubular bracket having means of rotational connection at one end to a support, a lamp structure supported at the other end of the bracket to rotate on an axis at an angle to the rotational axis of said bracket, and an operating shaft within and rotatably mounted at both ends of said bracket, and provided at its inner end beyond the bracket with an operating wheel, said shaft bearing for the inner end of said bracket comprising a rocking nipple to constitute an actuating member for the controlling switch of a lamp circuit.

30. A spot lamp and mounting comprising an elongated tubular bracket having means of rotational connection at one end to a support, a lamp structure supported at the other end of the bracket to rotate on an axis at an angle to the rotational axis of said bracket, and an operating shaft within and rotatably mounted at both ends of said bracket, and provided at its inner end beyond the bracket with an operating wheel, a shell fitted over the inner end of said bracket to enclose a lamp circuit switch, and a rocking nipple extending into said shell and constituting a bearing for the operating shaft and an actuating member for a switch.

31. A universal spot lamp and mounting of that type comprising a demountable lamp casing and a casing to contain a lamp cord reel, the support comprising a slitted tubular shaft, a solid tubular bearing in which the slitted portion of said shaft is rotatively mounted, with means to expand the slitted shaft outwardly into frictional contact with its bearing, said shaft being provided at its outer end with means to support the lamp casing, and the casing for the lamp cord reel, and a second shaft within the tubular shaft having at one end a hand operating device and at its other end a gear connection to the lamp casing mounting.

32. A spot lamp and mounting comprising a rotatively supported bracket, a lamp structure supported on said bracket and rotative about an axis at right angles to that of the bracket, a rotative and axially movable operating shaft and selective means associated with the operating shaft operative through axial movement of said shaft to universally adjust said lamp structure, and to occupy a neutral position to permit manual operation of said lamp structure independent of said shaft.

33. In a lamp mounting, a tubular bracket having means to support a universally adjustable lamp thereon, an operating shaft therefor axially within said bracket, the bracket having a bearing for said shaft, and a lamp circuit controlling switch, said bearing constituting an actuating device for said switch.

34. In a lamp mounting, a tubular bracket having means to support a universally adjustable lamp thereon, an operating shaft therefor axially within said bracket, the bracket having a bearing for said shaft, and a lamp circuit controlling switch, said bearing being rotative and surrounding said shaft and constituting a manually actuating device for said switch.

35. In a lamp mounting, a supporting bracket comprising a tubular slitted shaft, a solid tubular bearing in which the slitted portion of said shaft is mounted and adapted to rotate, and means to expand the said slitted portion of the shaft outwardly into frictional engagement with the said solid bearing.

36. In a lamp mounting, a supporting bracket comprising a tubular slitted shaft, a solid tubular bearing in which the slitted portion of said shaft is mounted and adapted to rotate, and a tapered stud threaded in an opening in said slitted portion of the shaft for expanding said shaft outwardly into frictional locking engagement with said solid tubular bearing.

37. A spot lamp and mounting comprising a tubular bracket having means of rotational connection to a support and provided at its outer end with a mounting, a member rotatively supported in said mounting, a lamp structure supported by said member by means permitting demounting of the lamp structure from said member, and an actuating shaft extending through said bracket and provided at one end with a hand piece, and means at the other end of said shaft to selectively and operatively connect said shaft to said member and to the bracket, to thereby impart universal movement to said lamp structure.

38. A spot lamp and mounting comprising a tubular rotative bracket provided at one end with a mounting, a lamp casing, a lamp cord reel casing supported in said mounting, a hollow upstanding member rotatively mounted in said mounting, a fitting to connect said upstanding member to said lamp casing, and a rotative shaft within said bracket having selective means to connect it to said upstanding member and bracket to separately rotate them.

39. A spot lamp and mounting comprising a tubular rotative bracket provided at one end with a mounting, a lamp casing and a lamp cord reel casing supported in said mounting, a hollow upstanding member rotatively mounted in said mounting, an elbow fitting having a horizontal member to which said lamp casing is fixed and a vertical member connected by a demountable joint to said upstanding member.

40. A spot lamp and mounting comprising a tubular bracket having means of rotational connection to a support and provided at its outer end with a ring, a member rotatively mounted in said ring, a lamp structure supported by said member by means permitting demounting of the lamp structure from said member and operating means to universally actuate said lamp structure, embracing selective means for independent connection to said bracket and to said lamp structure.

In witness whereof we claim the foregoing as our invention, we hereunto append our signatures at Chicago, Illinois, this 27th day of July, 1921.

ERNST G. K. ANDERSON.
PAUL W. SWANSON.